United States Patent
Hosseini et al.

(10) Patent No.: US 11,689,325 B2
(45) Date of Patent: Jun. 27, 2023

(54) FEEDBACK TRANSMISSION VIA A SIDELINK FEEDBACK CHANNEL RESOURCE OF A SIDELINK RESOURCE POOL

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Peter Gaal, San Diego, CA (US); Tingfang Ji, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/124,085

(22) Filed: Dec. 16, 2020

(65) Prior Publication Data

US 2022/0190970 A1  Jun. 16, 2022

(51) Int. Cl.
*H04L 1/1867* (2023.01)
*H04L 1/00* (2006.01)
*H04W 72/044* (2023.01)
*H04L 1/1812* (2023.01)

(52) U.S. Cl.
CPC .......... *H04L 1/1896* (2013.01); *H04L 1/0013* (2013.01); *H04L 1/1812* (2013.01); *H04W 72/044* (2013.01)

(58) Field of Classification Search
CPC ................. H04L 1/0013; H04L 1/1812; H04L 1/18–1896; H04W 72/044
See application file for complete search history.

(56) References Cited

U.S. PATENT DOCUMENTS

| | | | |
|---|---|---|---|
| 2014/0064233 A1* | 3/2014 | Oizumi | H04W 72/0446 370/329 |
| 2018/0054237 A1* | 2/2018 | Tseng | H04W 72/542 |
| 2018/0184424 A1* | 6/2018 | Wang | H04L 1/1671 |
| 2018/0213477 A1* | 7/2018 | John Wilson | H04W 72/1289 |
| 2019/0239112 A1* | 8/2019 | Rao | H04W 4/70 |
| 2019/0246377 A1* | 8/2019 | Zhou | H04W 72/0453 |
| 2020/0008068 A1* | 1/2020 | Belleschi | H04W 72/02 |
| 2020/0084659 A1* | 3/2020 | Pan | H04W 76/15 |
| 2020/0106566 A1* | 4/2020 | Yeo | H04W 28/04 |
| 2020/0145867 A1* | 5/2020 | Tseng | H04W 48/16 |
| 2020/0146010 A1* | 5/2020 | Abdoli | H04L 5/0044 |
| 2020/0163005 A1* | 5/2020 | Rao | H04W 8/24 |
| 2020/0275412 A1* | 8/2020 | Kim | H04L 1/1819 |
| 2020/0275474 A1* | 8/2020 | Chen | H04L 1/1887 |
| 2020/0351975 A1* | 11/2020 | Tseng | H04W 76/19 |

(Continued)

*Primary Examiner* — Dung B Huynh
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE, information via a sidelink interface between the first UE and the second UE. The UE may transmit, to the second UE, sidelink hybrid automatic repeat request acknowledgement feedback using a sidelink feedback channel resource of a sidelink resource pool via a sidelink component carrier based at least in part on the information received from the second UE. Numerous other aspects are provided.

30 Claims, 15 Drawing Sheets

(56) References Cited

U.S. PATENT DOCUMENTS

| | | | |
|---|---|---|---|
| 2020/0382354 A1* | 12/2020 | Sengupta | H04L 27/26025 |
| 2020/0389257 A1* | 12/2020 | Kung | H04B 17/24 |
| 2020/0396029 A1* | 12/2020 | Baldemair | H04W 72/0406 |
| 2020/0396717 A1* | 12/2020 | Luo | H04W 76/14 |
| 2021/0022055 A1* | 1/2021 | Tseng | H04W 36/0094 |
| 2021/0022127 A1* | 1/2021 | Xu | H04L 1/1854 |
| 2021/0029687 A1* | 1/2021 | Hong | H04L 5/0053 |
| 2021/0075561 A1* | 3/2021 | Baldemair | H04L 1/1614 |
| 2021/0127351 A1* | 4/2021 | Stojanovski | H04W 48/16 |
| 2021/0136646 A1* | 5/2021 | Tseng | H04L 5/0091 |
| 2021/0136856 A1* | 5/2021 | Tseng | H04W 76/14 |
| 2021/0143948 A1* | 5/2021 | Choi | H04L 5/0053 |
| 2021/0168852 A1* | 6/2021 | Panteleev | H04W 76/14 |
| 2021/0176747 A1* | 6/2021 | Yang | H04W 72/0446 |
| 2021/0185715 A1* | 6/2021 | Shen | H04L 5/0032 |
| 2021/0258922 A1* | 8/2021 | Xiao | H04W 72/02 |
| 2021/0258987 A1* | 8/2021 | Yang | H04W 80/02 |
| 2021/0266804 A1* | 8/2021 | Lee | H04W 80/02 |
| 2021/0297221 A1* | 9/2021 | Lee | H04L 5/0055 |
| 2021/0314933 A1* | 10/2021 | Zhang | H04L 5/0048 |
| 2021/0315049 A1* | 10/2021 | Wei | H04W 76/36 |
| 2021/0329510 A1* | 10/2021 | Tseng | H04W 36/0079 |
| 2021/0337527 A1* | 10/2021 | Hui | H04L 1/1861 |
| 2021/0368417 A1* | 11/2021 | Luo | H04W 76/20 |
| 2021/0392547 A1* | 12/2021 | Tang | H04W 28/16 |
| 2021/0400507 A1* | 12/2021 | You | H04W 52/02 |
| 2022/0006571 A1* | 1/2022 | Basu Mallick | H04L 1/1835 |
| 2022/0015071 A1* | 1/2022 | Hui | H04W 72/0446 |
| 2022/0045805 A1* | 2/2022 | Karaki | H04W 72/14 |
| 2022/0046564 A1* | 2/2022 | Shimoda | H04W 80/00 |
| 2022/0046698 A1* | 2/2022 | Zhao | H04W 72/14 |
| 2022/0053511 A1* | 2/2022 | Akkarakaran | H04W 72/1215 |
| 2022/0060929 A1* | 2/2022 | Hassan | H04W 72/085 |
| 2022/0070829 A1* | 3/2022 | Kusashima | H04L 1/1861 |
| 2022/0086607 A1* | 3/2022 | Ali | H04W 4/40 |
| 2022/0095139 A1* | 3/2022 | Ryu | H04L 5/0053 |
| 2022/0103298 A1* | 3/2022 | Lee | H04W 72/14 |
| 2022/0103299 A1* | 3/2022 | Sun | H04L 1/1812 |
| 2022/0104135 A1* | 3/2022 | Ryu | H04L 1/18 |
| 2022/0109546 A1* | 4/2022 | Panteleev | H04L 1/1887 |
| 2022/0124466 A1* | 4/2022 | Ali | H04W 4/40 |
| 2022/0141058 A1* | 5/2022 | Liu | H04L 25/03898 370/329 |
| 2022/0150908 A1* | 5/2022 | Ji | H04W 72/1205 |
| 2022/0159645 A1* | 5/2022 | Lee | H04W 72/0453 |
| 2022/0159649 A1* | 5/2022 | Ko | H04W 4/40 |
| 2022/0166588 A1* | 5/2022 | Hwang | H04L 5/0053 |
| 2022/0174672 A1* | 6/2022 | Ko | H04L 5/14 |
| 2022/0190970 A1* | 6/2022 | Hosseini | H04L 1/0013 |
| 2022/0200737 A1* | 6/2022 | Hosseini | H04L 5/0055 |
| 2022/0201670 A1* | 6/2022 | Hosseini | H04L 1/1864 |
| 2022/0286224 A1* | 9/2022 | Hosseini | H04L 5/001 |
| 2022/0303949 A1* | 9/2022 | Hosseini | H04W 24/08 |
| 2023/0014303 A1* | 1/2023 | Di Girolamo | H04W 76/28 |
| 2023/0024646 A1* | 1/2023 | Park | H04W 52/02 |
| 2023/0036953 A1* | 2/2023 | Hosseini | H04L 1/1896 |
| 2023/0049962 A1* | 2/2023 | Zhou | H04W 72/1263 |
| 2023/0050681 A1* | 2/2023 | Zhou | H04W 72/20 |
| 2023/0064573 A1* | 3/2023 | Li | H04W 72/044 |

* cited by examiner

FEEDBACK TRANSMISSION VIA A SIDELINK FEEDBACK CHANNEL RESOURCE OF A SIDELINK RESOURCE POOL

FIELD OF THE DISCLOSURE

Aspects of the present disclosure generally relate to wireless communication and to techniques and apparatuses for feedback transmission via a sidelink feedback channel resource of a sidelink resource pool.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE, information via a sidelink interface between the first UE and the second UE; and transmitting, to the second UE, sidelink hybrid automatic repeat request acknowledgement (HARQ-ACK) feedback using a sidelink feedback channel resource of a sidelink resource pool via a sidelink component carrier based at least in part on the information received from the second UE.

In some aspects, a first UE for wireless communication includes a memory and one or more processors operatively coupled to the memory, the memory and the one or more processors configured to: receive, from a second UE, information via a sidelink interface between the first UE and the second UE; and transmit, to the second UE, sidelink HARQ-ACK feedback using a sidelink feedback channel resource of a sidelink resource pool via a sidelink component carrier based at least in part on the information received from the second UE.

In some aspects, a non-transitory computer-readable medium storing a set of instructions for wireless communication includes one or more instructions that, when executed by one or more processors of a first UE, cause the first UE to: receive, from a second UE, information via a sidelink interface between the first UE and the second UE; and transmit, to the second UE, sidelink HARQ-ACK feedback using a sidelink feedback channel resource of a sidelink resource pool via a sidelink component carrier based at least in part on the information received from the second UE.

In some aspects, a first apparatus for wireless communication includes means for receiving, from a second apparatus, information via a sidelink interface between the first apparatus and the second apparatus; and means for transmitting, to the second apparatus, sidelink HARQ-ACK feedback using a sidelink feedback channel resource of a sidelink resource pool via a sidelink component carrier based at least in part on the information received from the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
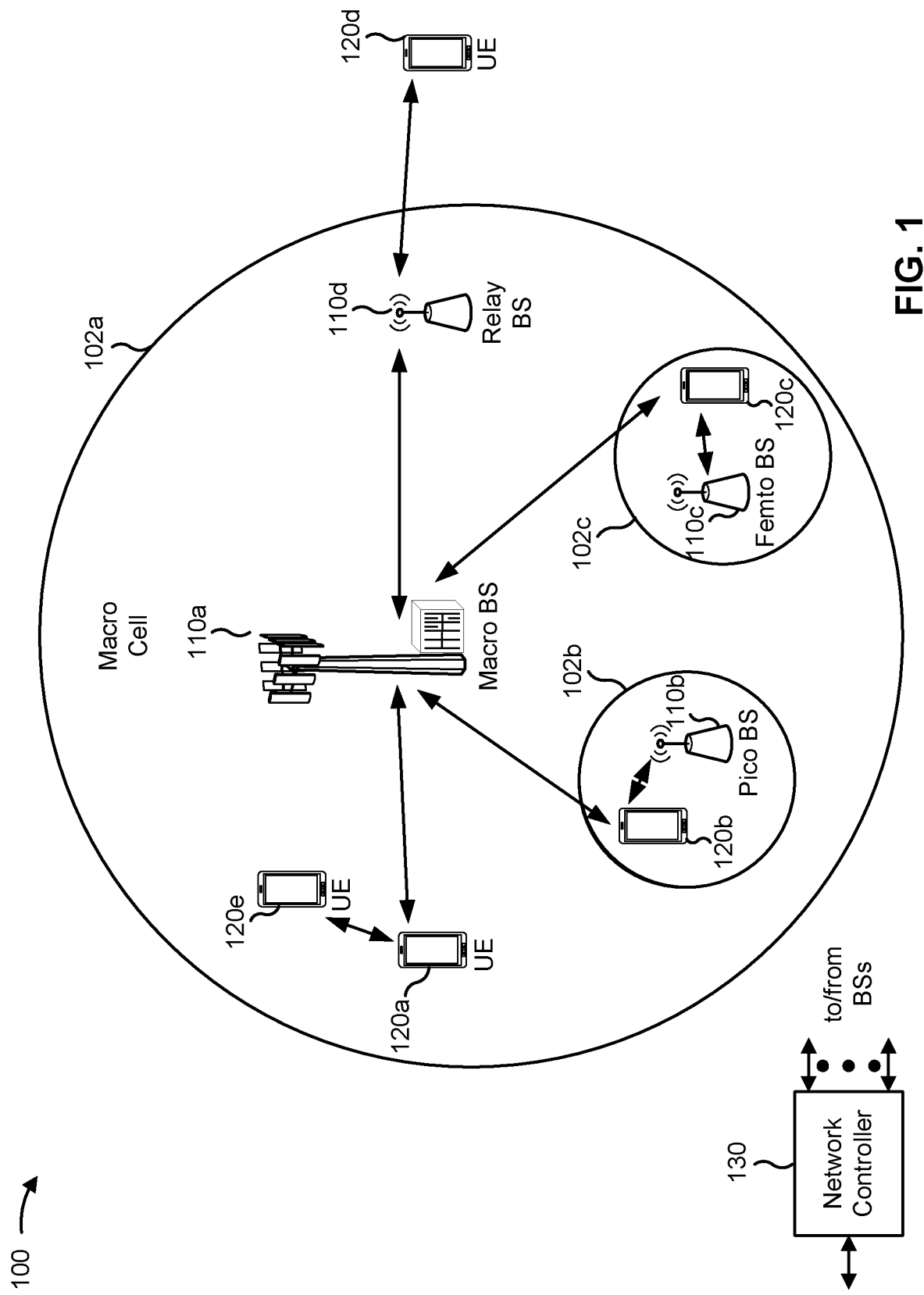
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
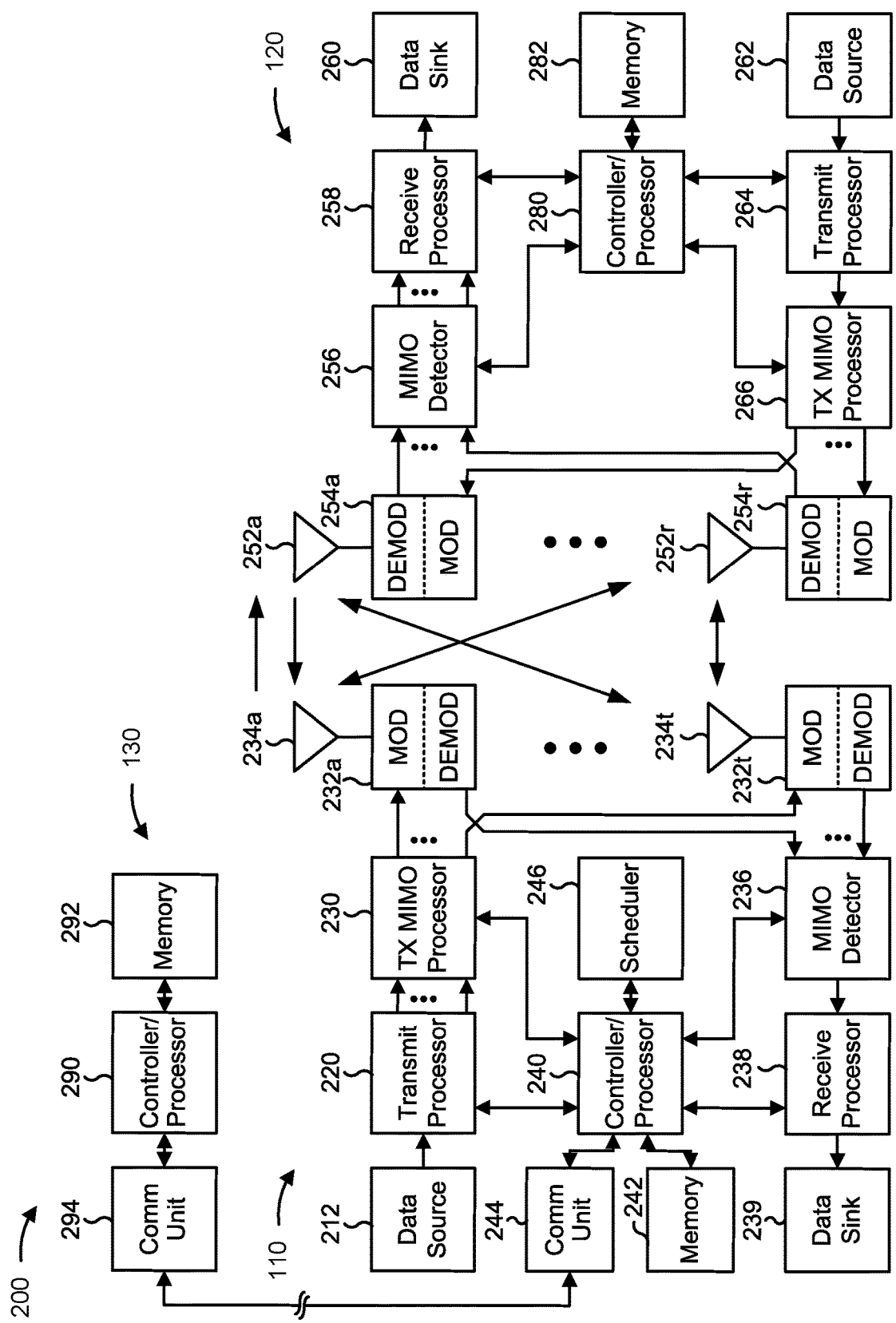
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-14.

Controller/processor 240 of base station 110, controller/processor 280 of UE 120, and/or any other component(s) of FIG. 2 may perform one or more techniques associated with feedback transmission via a sidelink feedback channel resource of a sidelink resource pool, as described in more detail elsewhere herein. For example, controller/processor 240 of base station 110, controller/processor 280 of UE 120, and/or any other component(s) of FIG. 2 may perform or direct operations of, for example, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, and/or other processes as described herein. In some aspects, executing instructions may include running the instructions, converting the instructions, compiling the instructions, and/or interpreting the instructions, among other examples.

In some aspects, a first UE (e.g., UE 120) includes means for receiving, from a second UE, information via a sidelink interface between the first UE and the second UE; or means for transmitting, to the second UE, sidelink hybrid automatic repeat request acknowledgement (HARQ-ACK) feedback using a sidelink feedback channel resource of a sidelink resource pool via a sidelink component carrier based at least in part on the information received from the second UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
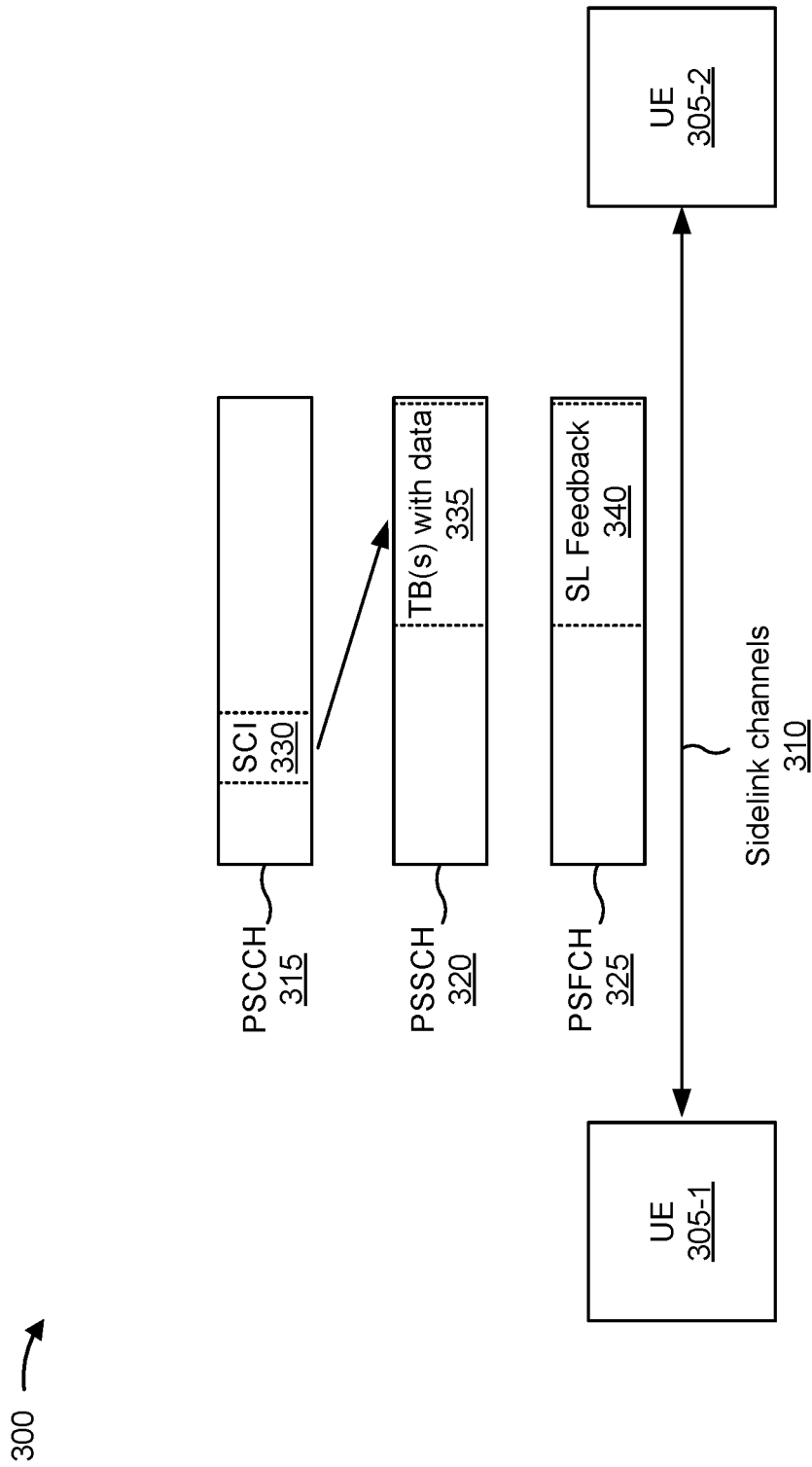
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-toperson (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
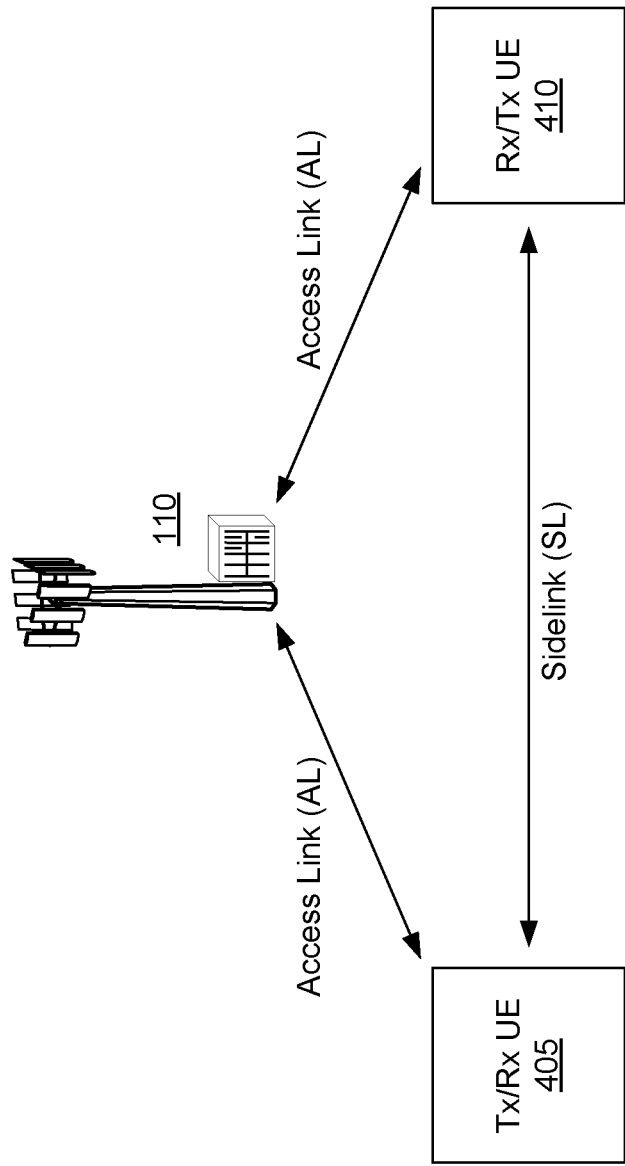
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In an LTE system, sidelink carrier aggregation was adopted for an LTE Mode 4 resource allocation. The LTE Mode 4 resource allocation may correspond to an NR Mode 2 resource allocation, in which autonomous transmissions may be performed via a sidelink channel via a sensing and reservation mechanism. From a physical layer perspective, up to eight sidelink (SL) component carriers (CCs) may be aggregated. Further, particular sidelink component carriers may be indicated by higher layers for a transmission and potential retransmission of data, such as a medium access control (MAC) protocol data unit (PDU).

A configuration for aggregated sidelink component carriers may be provided via the higher layers. A subset of the aggregated sidelink component carriers may be active in a UE at a given time depending on active applications executing on the UE. A mapping between a given sidelink component carrier and a given application may occur at higher layers. For example, UEs interested in a given application may identify a set of sidelink component carriers activated for transmissions and/or receptions, with no handshaking or negotiation involved for the UEs. One application may be mapped to a single sidelink component carrier. In some cases, UEs with carrier aggregation and non-carrier aggregation capabilities may communicate with each other. Non-carrier aggregation UEs may support basic safety messages, which may be mapped to a sidelink component carrier that is shared by both non-carrier aggregation UEs and UEs having a carrier aggregation capability.

In an NR system, sidelink carrier aggregation may be associated with two separate operating modes. In a first operating mode, sidelink carrier aggregation may be set up and controlled by the network. In a second operating mode, sidelink carrier aggregation may be set up by peer UEs, such as other sidelink UEs.

In the NR system, sidelink carrier aggregation may be associated with one of several cast types, such as unicast, groupcast, or broadcast. With respect to unicast, one unicast session or multiple unicast sessions may be supported. For example, one relay UE may support multiple remote UEs in multiple unicast sessions.

Several differences exist between sidelink carrier aggregation in the LTE system versus sidelink carrier aggregation in the NR system. The LTE system may support broadcast but not unicast and groupcast, whereas the NR system may support unicast, groupcast and broadcast. The LTE system may not support sidelink HARQ feedback, whereas the NR system may support sidelink HARQ feedback. The NR system may support the sidelink HARQ feedback for unicast and groupcast. In the LTE system, the sidelink carrier aggregation may not be controlled by a base station, whereas in the NR system, the sidelink carrier aggregation may not controlled by the base station.

One bandwidth part may be configured with multiple transmit and receive sidelink resource pools. Each transmit sidelink resource pool may also be used for receptions. However, a given receive sidelink resource pool may not be used for transmissions. A PSFCH configuration may be per sidelink resource pool.

On a given bandwidth part, a plurality of sidelink resource pools (e.g., all sidelink resource pools) may have a same PSFCH configuration. As a result, when a UE is active on multiple sidelink resource pools, phase discontinuity due to non-aligned transmissions may not occur.

Alternatively, a PSFCH configuration may be across different carriers. A phase discontinuity may be a function of the PSFCH configuration and a subcarrier spacing (SCS) configured for different resource pools or bandwidth parts (BWPs) on different carriers. For example, a BWP on one carrier may be 30 KHz and a BWP on another carrier may be 15 KHz. If component carriers are intra-band, even without a PSFCH, a missing phase continuity may be likely since slot durations may be different for the different BWPs and/or different carriers.

For sidelink carrier aggregation, sidelink component carriers may be preconfigured, and each bandwidth part may be preconfigured with a number of sidelink resource pools. Alternatively, for sidelink carrier aggregation, sidelink component carriers may be configured and sidelink resource pools associated with each bandwidth part may be configured by a third node, such as a base station or a relay node.

Figure 5:
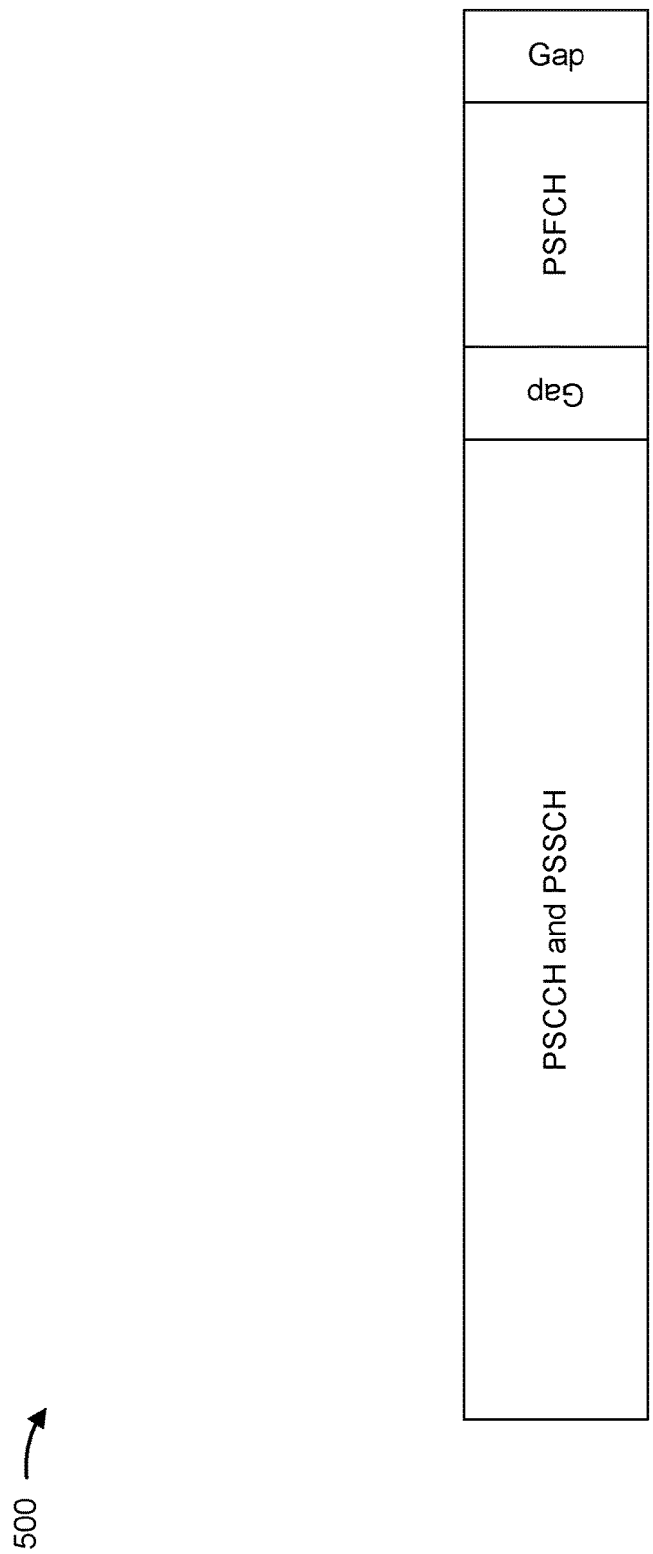
FIG. 5 is a diagram illustrating an example of sidelink channels, in accordance with various aspects of the present disclosure.

FIG. 5 is a diagram illustrating an example 500 of sidelink channels, in accordance with various aspects of the present disclosure.

As shown in FIG. 5, a PSCCH and a PSSCH may be associated with a plurality of resources in a time domain and a frequency domain. A PSFCH may be associated with a plurality of resources in the time domain and the frequency domain. The PSCCH and the PSSCH may not be separated by a gap. The PSCCH and the PSSCH may be separated by a gap with the PSFCH.

As indicated above, FIG. 5 is provided as an example. Other examples may differ from what is described with regard to FIG. 5.

Figure 6:
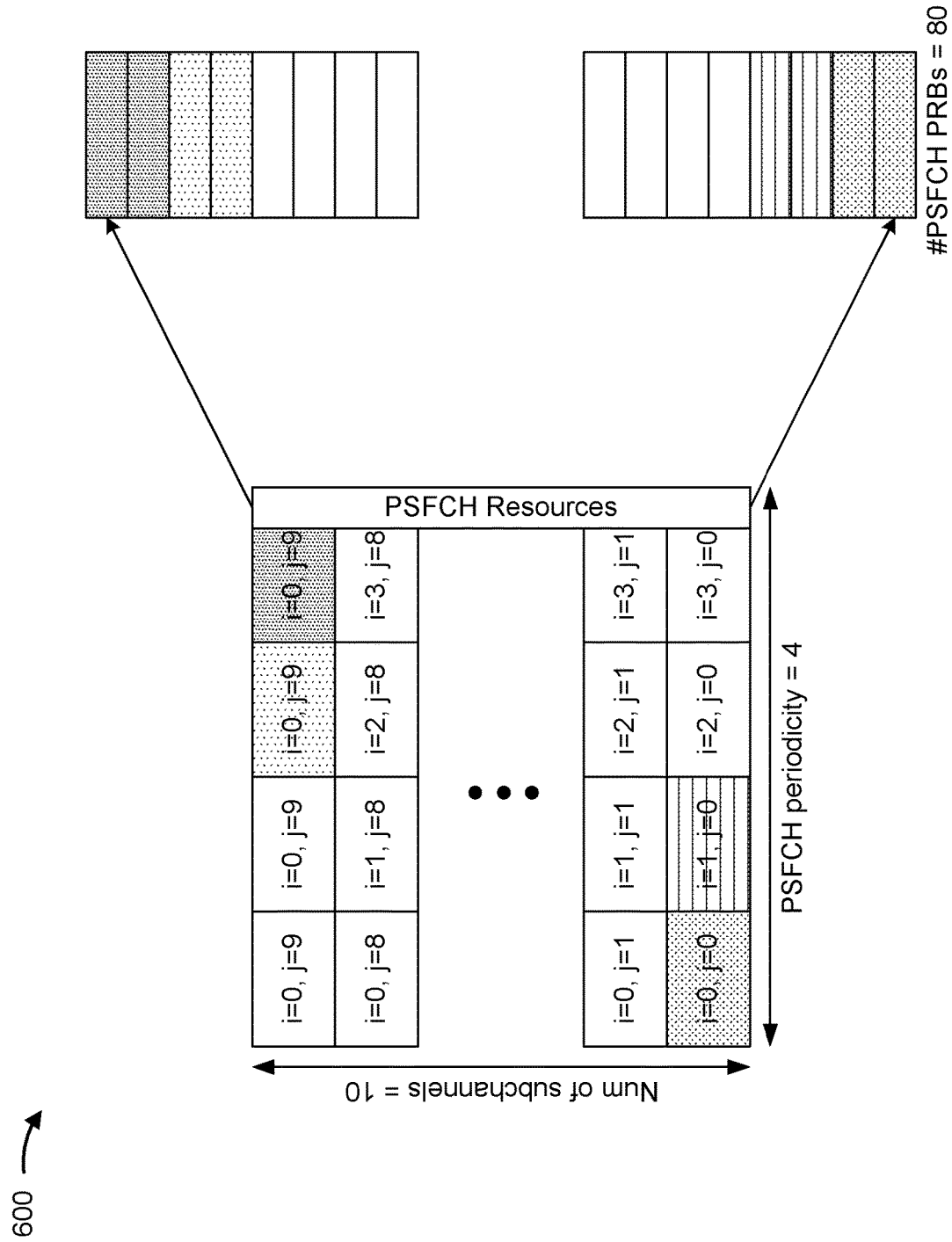
FIG. 6 is a diagram illustrating an example of determining a physical sidelink feedback channel (PSFCH) resource, in accordance with various aspects of the present disclosure.

FIG. 6 is a diagram illustrating an example 600 of determining a PSFCH resource, in accordance with various aspects of the present disclosure.

A periodic PSFCH resource (periodPSFCHresource) parameter may indicate a PSFCH periodicity, in number of slots, in a sidelink resource pool. The period PSFCH resource parameter may be set to {0, 1, 2, 4}. When the period PSFCH resource parameter is set to 0, PSFCH transmissions from a UE in the sidelink resource pool may be disabled. The UE may transmit the PSFCH in a first slot that includes PSFCH resources and is at least a number of slots, as provided by a minimum time gap of PSFCH (MinTimeGapPSFCH) parameter, of the sidelink resource pool after a last slot of a PSSCH reception. A resource block set PSFCH (rbSetPSFCH) parameter may indicate a set of $M_{PRB,set}^{PSFCH}$ physical resource blocks in the sidelink resource pool for PSFCH transmission. A number of sub-channels (numSubchannel) parameter may indicate a number of $N_{subch}$ sub-channels for the sidelink resource pool. A number of PSSCH slots associated with a PSFCH slot may be represented by $N_{PSSCH}^{PSFCH}$, and may be determined based at least in part on the periodPSFCHresource parameter. Further, $M_{PRB,set}^{PSFCH} = \alpha \cdot N_{subch} \cdot N_{PSSCH}^{PSFCH}$, where $\alpha$ represents an integer value. Further, $$M_{subch,slot}^{PSFCH} = \frac{M_{PRB,set}^{PSFCH}}{N_{subch} \cdot N_{PSSCH}^{PSFCH}},$$

where $M_{subch,slot}^{PSFCH}$ represents a number of PSFCH physical resource blocks (PRBs) for a sub-channel.

The UE may allocate $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ physical resource blocks from $M_{PRB,set}^{PSFCH}$ physical resource blocks to slot i and sub-channel j, where $0 \leq i \leq N_{PSSCH}^{PSFCH}$ and $0 \leq j \leq N_{subch}$.

In the example shown in FIG. 4, $N_{PSSCH}^{PSFCH}$ may be equal to four, which may correspond to a PSFCH periodicity. Further, $N_{subch}$ may be equal to ten, which may correspond to a number of subchannels for the sidelink resource pool. Further, $M_{subch,slot}^{PSFCH}$ may correspond to $$\frac{80}{4 \times 10},$$

is equal to two, which may correspond to 80 PRBs for the PSFCH. In this example, each sub-channel may be associated with two PSFCH PRBs, but the PSFCH may be sent on one of the PSFCH PRBs.

As indicated above, FIG. 6 is provided as an example. Other examples may differ from what is described with regard to FIG. 6.

As explained above, in an NR system, sidelink HARQ-ACK feedback may be supported, which was not previously supported in an LTE system. However, sidelink UEs may not be configured to transmit sidelink HARQ-ACK feedback for sidelink carrier aggregation. In other words, sidelink UEs may not be configured to transmit sidelink HARQ-ACK feedback using particular sidelink component carriers and/or sidelink resource pools.

In various aspects of techniques and apparatuses described herein, sidelink HARQ-ACK feedback may be managed on a per sidelink component carrier and per sidelink resource pool basis. In other words, the sidelink HARQ-ACK feedback for transmissions on a given sidelink resource pool within a given sidelink component carrier may be received on PSFCH resources of the same sidelink resource pool. In some aspects, within a group of preconfigured sidelink component carriers, sidelink component carriers that are associated with a same PSFCH configuration may be aggregated. In some aspects, within the group of preconfigured sidelink component carriers, intra-band sidelink component carriers in sidelink carrier aggregation may be associated with a same PSFCH configuration. In some aspects, rate matching patterns may be defined on a per sidelink component carrier basis, where the rate matching pattern of one sidelink component carrier may be a function of a PSFCH configuration on other aggregated sidelink component carriers. In some aspects, the rate matching patterns may be applied to sidelink intra-band component carriers.

Figure 7:
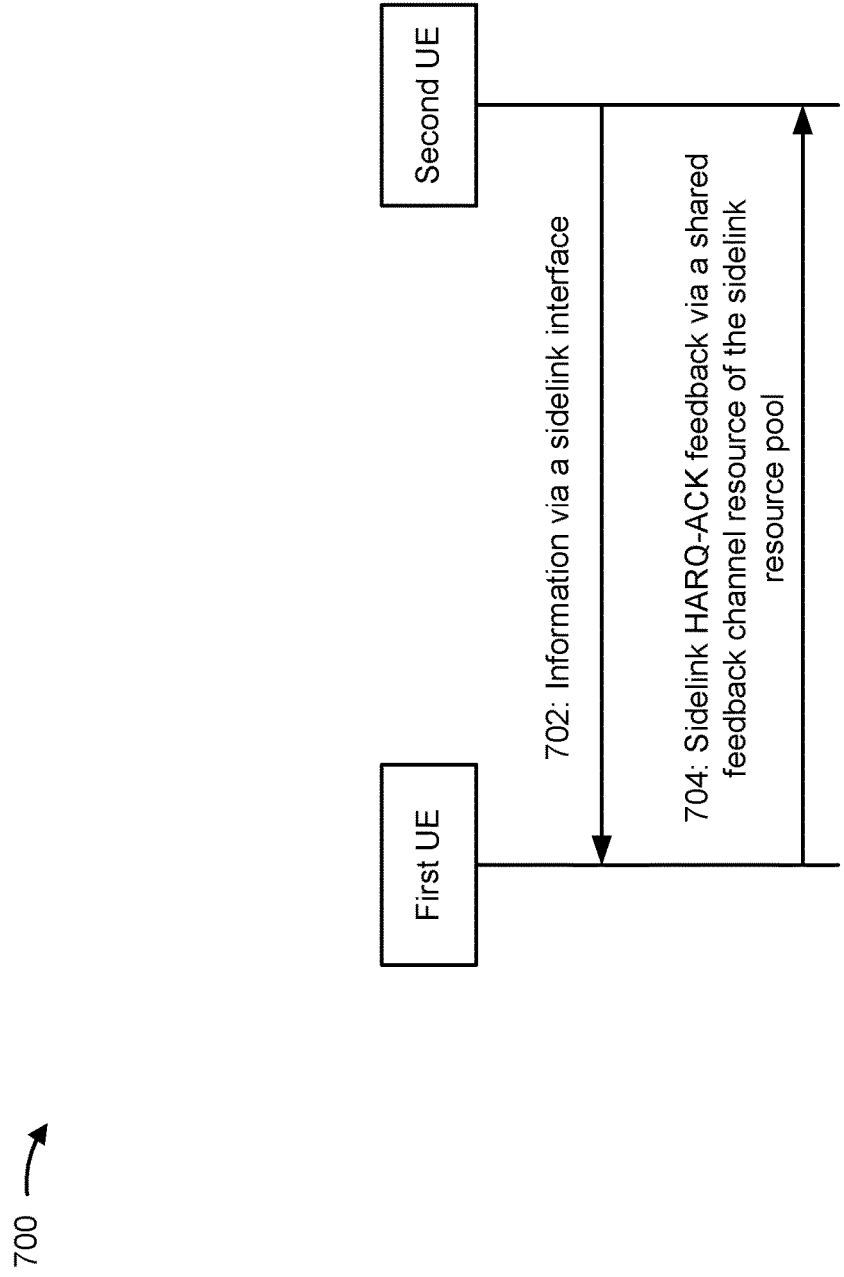
FIGS. 7-13 are diagrams illustrating examples associated with feedback transmission via a sidelink feedback channel resource of a sidelink resource pool, in accordance with various aspects of the present disclosure.

FIG. 7 is a diagram illustrating an example 700 associated with feedback transmission via a sidelink feedback channel resource of a sidelink resource pool, in accordance with various aspects of the present disclosure. As shown in FIG. 7, example 700 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

As shown by reference number 702, the first UE may receive information from the second UE. The first UE may receive the information via a sidelink interface between the first UE and the second UE. In some aspects, the first UE and the second UE may communicate using one or more sidelink component carriers when sidelink carrier aggregation is configured for the first UE and the second UE.

As shown by reference number 704, the first UE may transmit, to the second UE, sidelink HARQ-ACK feedback using a PSFCH resource of a sidelink resource pool via a sidelink component carrier. The first UE may transmit the sidelink HARQ-ACK feedback after receiving the information from the second UE via the sidelink interface.

In some aspects, the sidelink HARQ-ACK feedback may be managed per sidelink component carrier and per sidelink resource pool. In other words, the HARQ-ACK feedback for transmissions on a given sidelink resource pool within a given sidelink component carrier may be received on PSFCH resources of the same sidelink resource pool. When the sidelink resource pool is not configured with PSFCH resources, then no sidelink HARQ-ACK feedback may be performed for the transmissions on the sidelink resource pool.

As indicated above, FIG. 7 is provided as an example. Other examples may differ from what is described with regard to FIG. 7.

Figure 8:
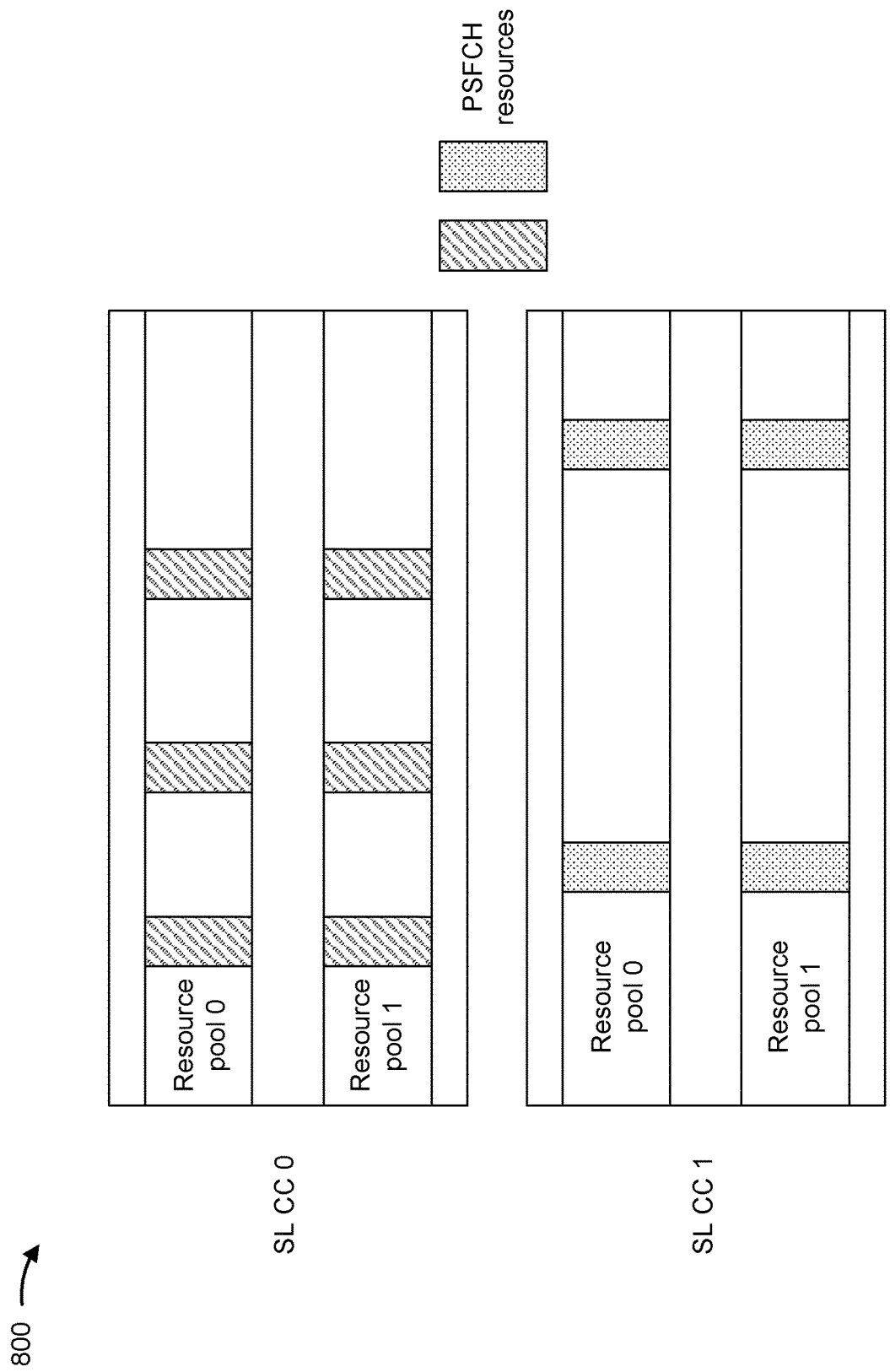

FIG. 8 is a diagram illustrating an example 800 associated with feedback transmission via a sidelink feedback channel resource of a sidelink resource pool, in accordance with various aspects of the present disclosure.

As shown in FIG. 8, a first sidelink component carrier (SL CC 0) may be associated with a first sidelink resource pool and a second sidelink resource pool. The first and second sidelink resource pools may include PSFCH resources. Further, a second sidelink component carrier (SL CC 1) may be associated with a first sidelink resource pool and a second sidelink resource pool. The first and second sidelink resource pools may include PSFCH resources. The PSFCH resources associated with the first sidelink component carrier may be separate from the PSFCH resources associated with the second sidelink component carrier. In these examples, sidelink HARQ-ACK feedback via PSFCH resources may be managed per sidelink component carrier and per sidelink resource pool.

As indicated above, FIG. 8 is provided as an example. Other examples may differ from what is described with regard to FIG. 8.

Figure 9:
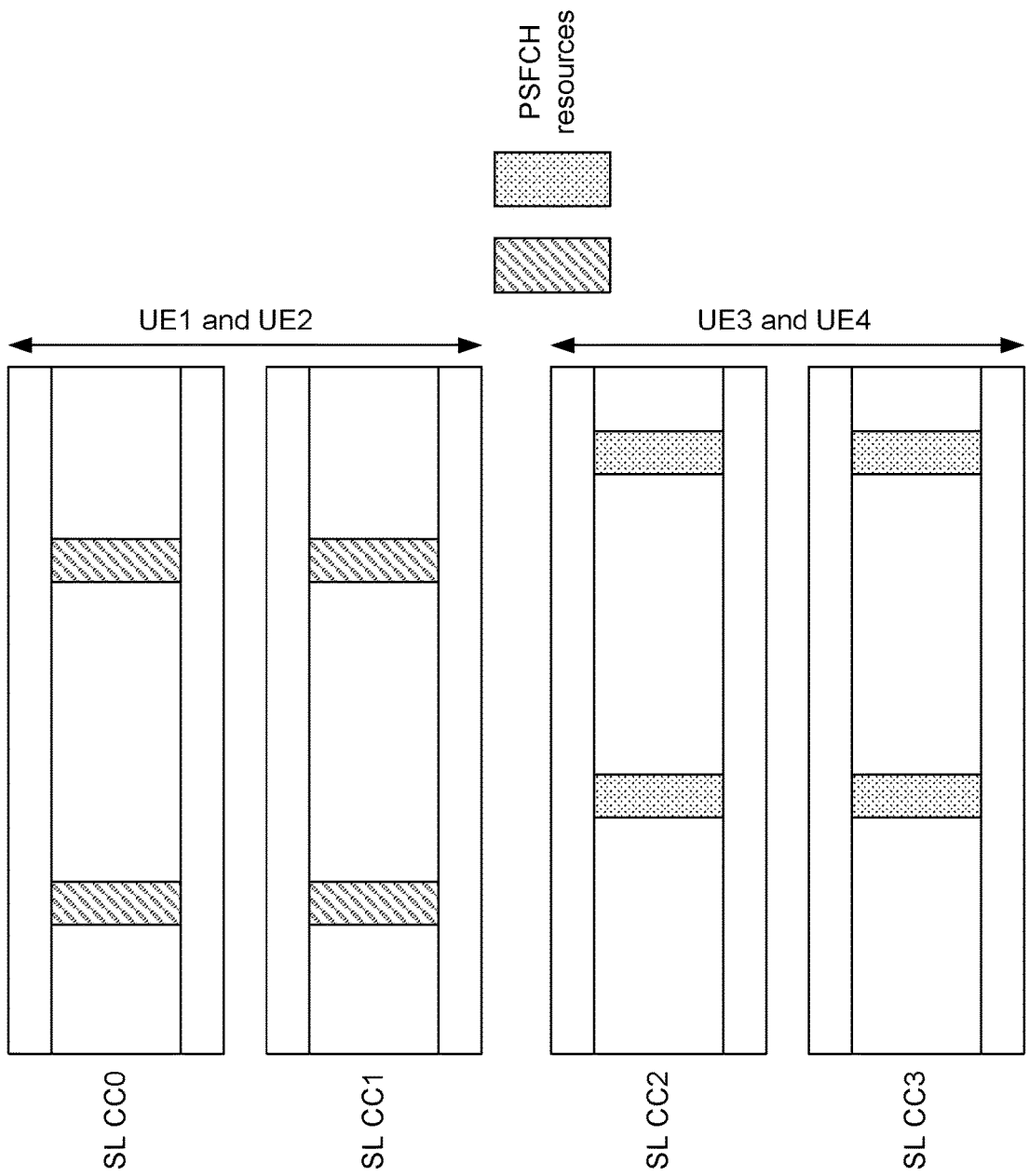

FIG. 9 is a diagram illustrating an example 900 associated with feedback transmission via a sidelink feedback channel resource of a sidelink resource pool, in accordance with various aspects of the present disclosure.

In some aspects, sidelink component carrier(s) used for conveying sidelink HARQ-ACK feedback may be included in a group of preconfigured sidelink component carriers. The group of preconfigured sidelink component carriers may be aggregated when sidelink carrier aggregation is configured for a group of UEs. The group of UEs may be a pair of UEs. The group of preconfigured sidelink component carriers may be associated with a same PSFCH configuration. In other words, within the group of preconfigured sidelink component carriers, sidelink component carriers associated with a same PSFCH configuration may be aggregated.

As shown in FIG. 9, sidelink carrier aggregation may be configured for a group of UEs. For example, sidelink carrier aggregation may be configured on a first sidelink component carrier (SL CC0) and a second sidelink component carrier (SL CC1) for a first UE and a second UE. The first and second sidelink component carriers may include PSFCH resources for transmitting sidelink HARQ-ACK feedback. As another example, sidelink carrier aggregation may be configured on a third sidelink component carrier (SL CC2) and a fourth sidelink component carrier (SL CC3) for a third UE and a fourth UE. The third and fourth sidelink component carriers may include PSFCH resources for transmitting sidelink HARQ-ACK feedback. The first and second sidelink component carriers may be associated with a first PSFCH configuration, and the third and fourth sidelink component carriers may be associated with a second PSFCH configuration.

As indicated above, FIG. 9 is provided as an example. Other examples may differ from what is described with regard to FIG. 9.

Figure 10:
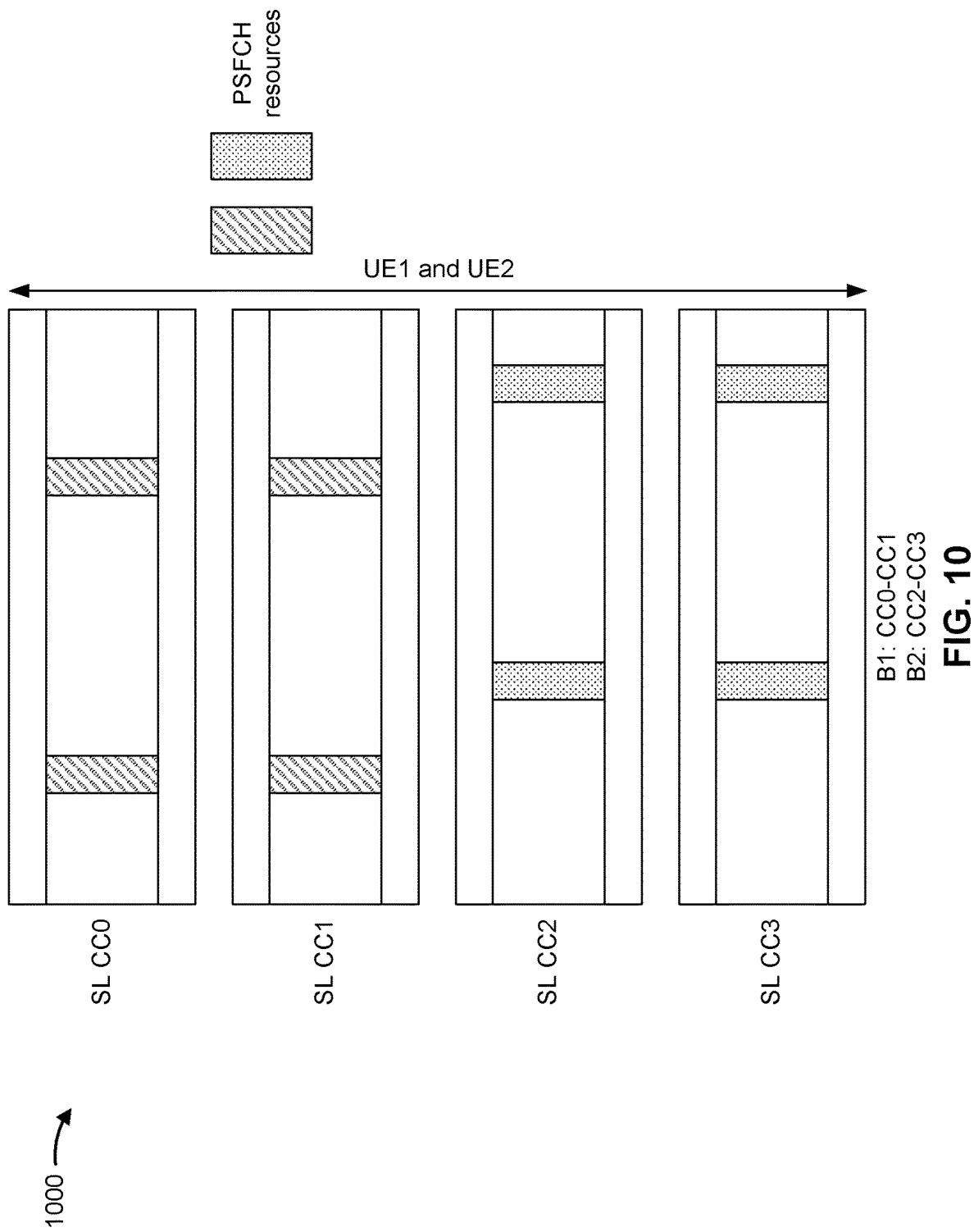

FIG. 10 is a diagram illustrating an example 1000 associated with feedback transmission via a sidelink feedback channel resource of a sidelink resource pool, in accordance with various aspects of the present disclosure.

In some aspects, sidelink component carrier(s) used for conveying sidelink HARQ-ACK feedback may be included in a group of preconfigured intra-band sidelink component carriers. The group of preconfigured intra-band sidelink component carriers may be aggregated when sidelink carrier aggregation is configured for a pair of UEs or a group of UEs. The group of intra-band preconfigured sidelink component carriers may be associated with a same PSFCH configuration. In other words, within the group of preconfigured intra-band sidelink component carriers, sidelink intra-band component carriers associated with a same PSFCH configuration may be aggregated.

In some aspects, for intra-band, a PSFCH and/or an SCS of resource pools of aggregated component carriers between two or more UEs may be configured to be identical.

As shown in FIG. 10, a group of sidelink component carriers may be configured for a first UE and a second UE. The group of sidelink component carriers may be intra-band sidelink component carriers. The group of sidelink component carriers may include a first sidelink component carrier (SL CC0) and a second sidelink component carrier (SL CC1), where the first sidelink component carrier and the second sidelink component carrier may be associated with a first band. The group of sidelink component carriers may include a third sidelink component carrier (SL CC2) and a fourth sidelink component carrier (SL CC3), where the third sidelink component carrier and the fourth sidelink component carrier may be associated with a second band. In this example, the first and second sidelink component carriers may be associated with corresponding PSFCH resources in accordance with a same PSFCH configuration. Further, the third and fourth sidelink component carriers may be associated with corresponding PSFCH resources in accordance with a same PSFCH configuration. The PSFCH configuration associated with the first and second sidelink component carriers may be different than the PSFCH configuration associated with the third and fourth sidelink component carriers.

In some aspects, sidelink component carriers on which the UE(s) may perform simultaneous transmissions with aligned channels may be associated with a common PSFCH configuration. In other words, rather than intra-band sidelink component carriers and inter-band sidelink component carriers, sidelink component carriers on which the UE(s) may perform simultaneous transmissions with aligned channels may have a same PSFCH configuration.

As indicated above, FIG. 10 is provided as an example. Other examples may differ from what is described with regard to FIG. 10.

Figure 11:
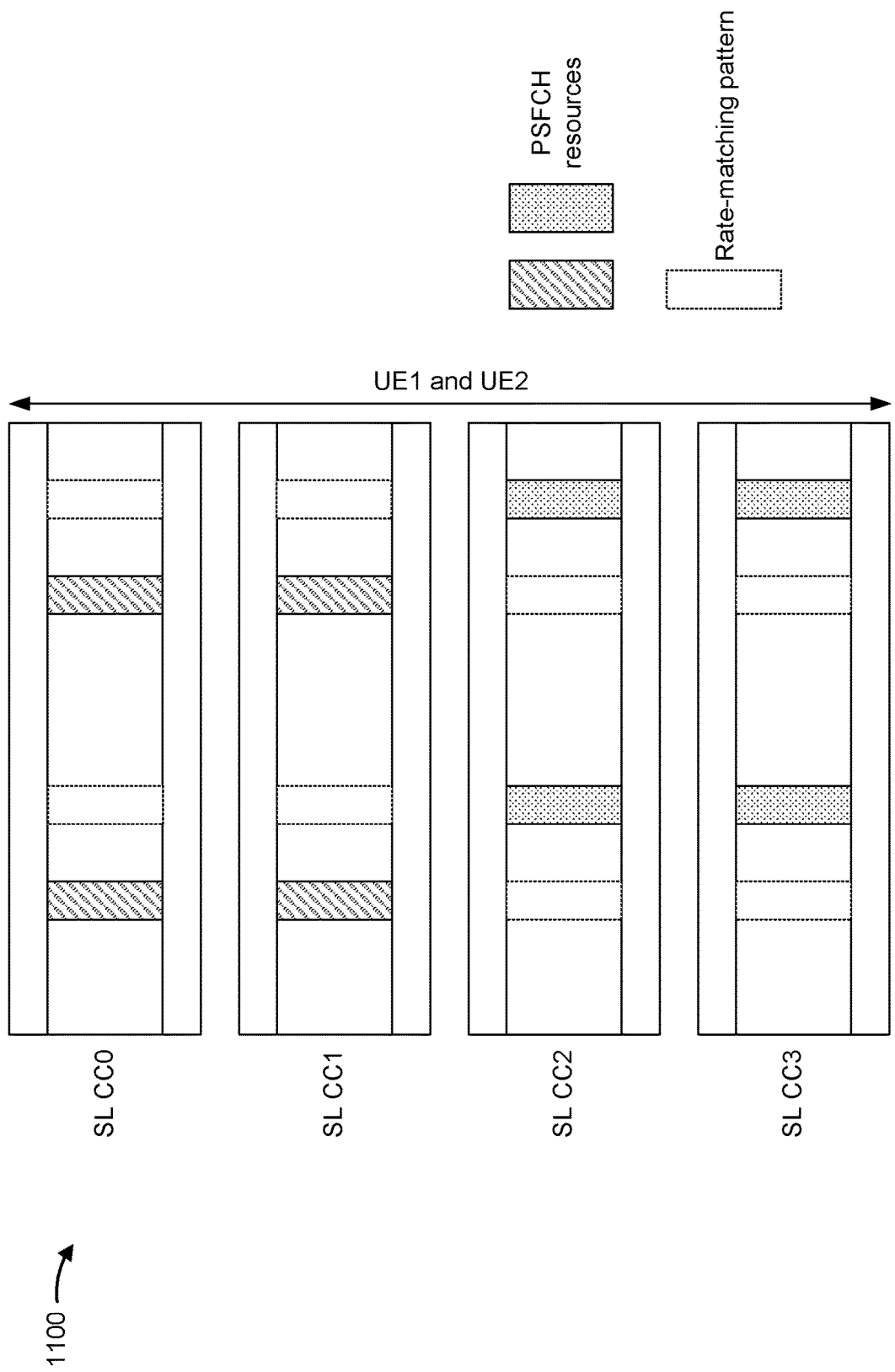

FIG. 11 is a diagram illustrating an example 1100 associated with feedback transmission via a sidelink feedback channel resource of a sidelink resource pool, in accordance with various aspects of the present disclosure.

In some aspects, a rate matching pattern may be defined per sidelink component carrier. For example, a rate matching pattern associated with a first sidelink component carrier may be a function of a PSFCH configuration on other aggregated sidelink component carriers, such as a second sidelink component carrier that is aggregated with the first sidelink component carrier. The PSFCH configuration may include a periodicity. In some cases, a first slot associated with the first sidelink component carrier may not be associated with a PSFCH resource and a second slot associated with the second sidelink component carrier may be associated with a PSFCH, wherein a length of a PSCCH or a PSSCH associated with the first sidelink component carrier may be shortened to correspond to a length of the PSFCH of the second slot. In other words, while some slots may not be assigned with PSFCH resources associated with a given sidelink resource pool of a given sidelink component carrier, since other sidelink component carriers may have PSFCH resources, a PSCCH/PSSCH length on the other sidelink component carriers may be shortened as if the PSCCH/PSSCH are transmitted or received in PSFCH slots.

As shown in FIG. 11, a group of sidelink component carriers may be configured for a first UE and a second UE. The group of sidelink component carriers may include a first sidelink component carrier (SL CC0), a second sidelink component carrier (SL CC1), a third sidelink component carrier (SL CC2), and a fourth sidelink component carrier (SL CC3). The group of sidelink component carriers may be configured on a per sidelink component carrier and per sidelink resource pool basis. For example, the group of sidelink component carriers may be associated with PSFCH resources that are configured on a per sidelink component carrier and per sidelink resource pool basis. Further, a rate matching pattern may be defined for the group of sidelink component carriers on a per sidelink component carrier basis, where the rate matching pattern on one carrier (e.g., the first sidelink component carrier) may be a function of a PSFCH configuration on other aggregated carriers (e.g., the second sidelink component carrier, the third sidelink component carrier, and/or the fourth sidelink component carrier).

As indicated above, FIG. 11 is provided as an example. Other examples may differ from what is described with regard to FIG. 11.

Figure 12:
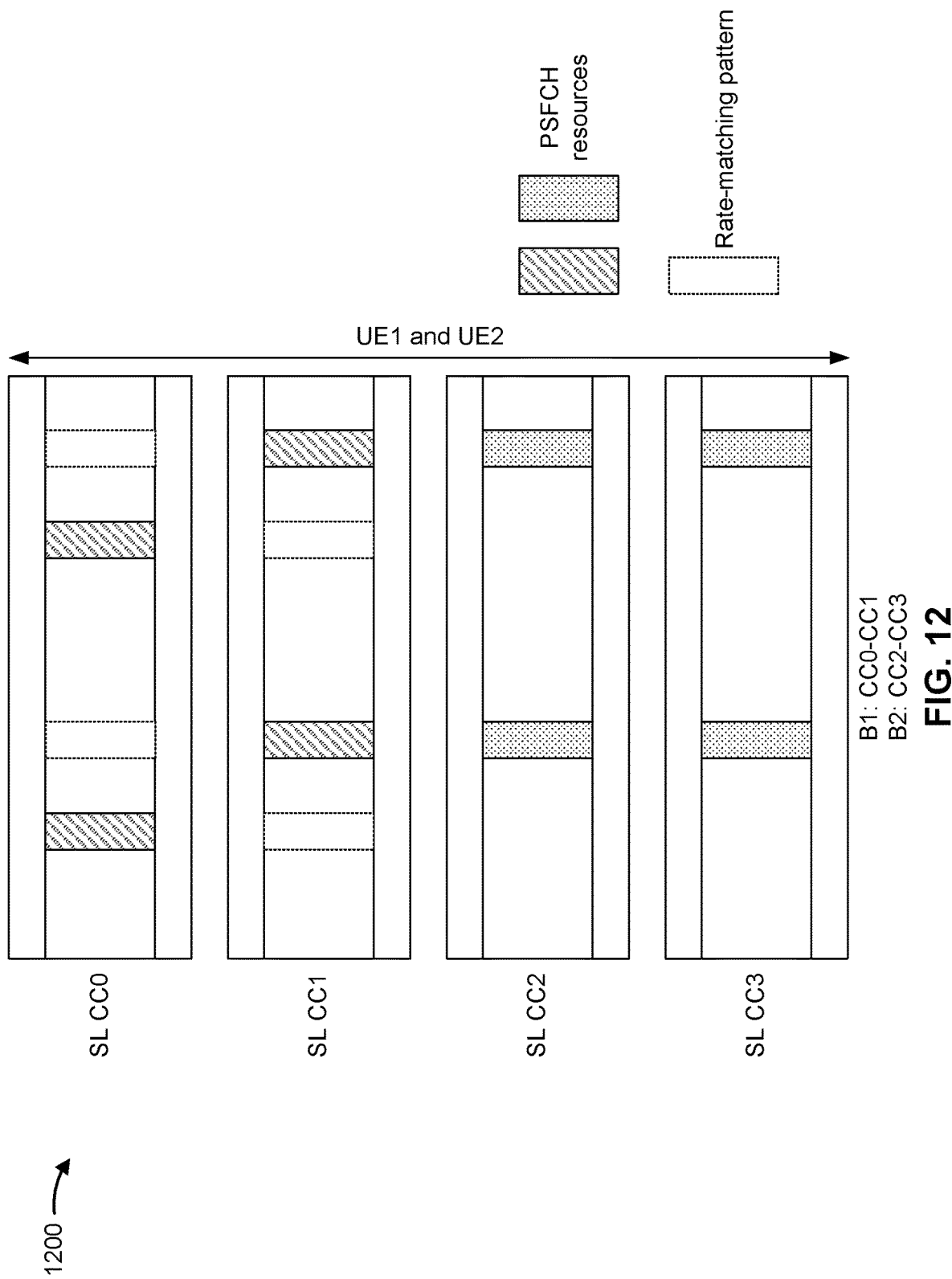

FIG. 12 is a diagram illustrating an example 1200 associated with feedback transmission via a sidelink feedback channel resource of a sidelink resource pool, in accordance with various aspects of the present disclosure.

In some aspects, a rate matching pattern may be defined per sidelink intra-band component carrier. For example, a rate matching pattern associated with a first sidelink intra-band component carrier may be a function of a PSFCH configuration on other aggregated sidelink intra-band component carriers, such as a second sidelink intra-band component carrier that is aggregated with the first sidelink intra-band component carrier.

As shown in FIG. 12, group(s) of sidelink component carriers may be configured for a first UE and a second UE. The group(s) of sidelink component carriers may include a first sidelink component carrier (SL CC0), a second sidelink component carrier (SL CC1), a third sidelink component carrier (SL CC2), and a fourth sidelink component carrier (SL CC3), where the first and second sidelink component carriers may be associated with a first band and the third and fourth sidelink component carriers may be associated with a second band. The first and second bands may be associated with PSFCH resources on a per band basis. Further, a rate matching pattern may be defined for the group of sidelink component carriers on a per sidelink intra-band component carrier basis. As shown in the example in FIG. 12, a rate matching pattern may be applied to the first and second sidelink component carriers associated with the first band, but a rate matching pattern may not be applied to the third and fourth sidelink component carriers associated with the second band.

As indicated above, FIG. 12 is provided as an example. Other examples may differ from what is described with regard to FIG. 12.

Figure 13:
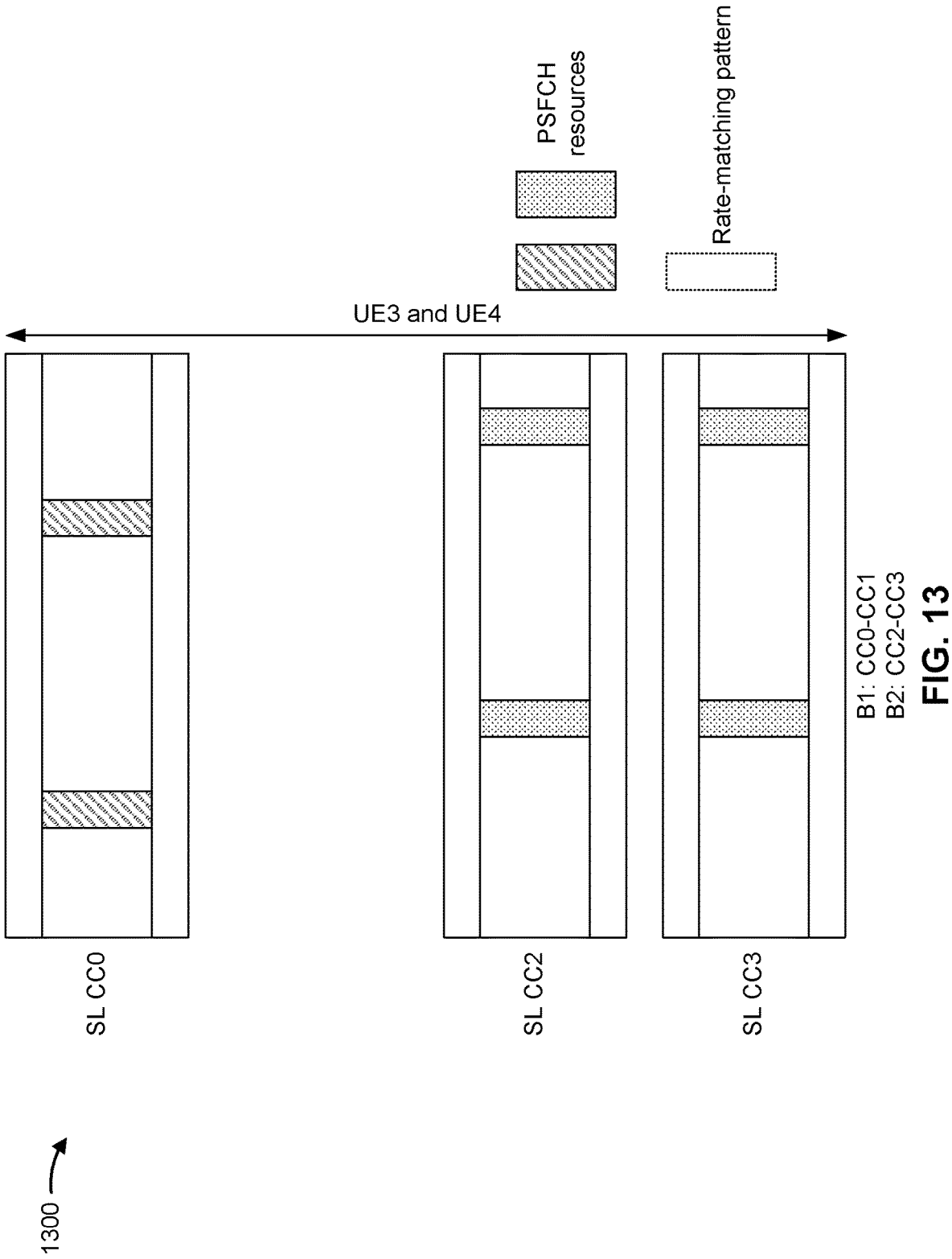

FIG. 13 is a diagram illustrating an example 1300 associated with feedback transmission via a sidelink feedback channel resource of a sidelink resource pool, in accordance with various aspects of the present disclosure.

In some aspects, a rate matching pattern for a first group of UEs may not affect a second group of UEs, where the first group of UEs and the second group of UEs may be associated with a same set of sidelink component carriers or a same sidelink resource pool. In other words, defining a rate matching pattern for a pair of UEs or a group of UEs may not impact an operation of another set of UEs, even when a same set of sidelink resource pools or sidelink component carriers are used.

As shown in FIG. 13, group(s) of sidelink component carriers may be configured for a third UE and a fourth UE. The third and fourth UEs may be a separate pair of UEs in relation to first and second UEs, as described in FIG. 12. In this example, the group(s) of sidelink component carriers configured for the third UE and the fourth UE may include a first sidelink component carrier (SL CC0), a third sidelink component carrier (SL CC2), and a fourth sidelink component carrier (SL CC3), as shown in FIG. 12. In this example, a rate matching pattern may not be applied to the first, third, and fourth sidelink component carriers with respect to the third and fourth UEs. In other words, a rate matching pattern defined for the first and second UEs may not impact an operation of the third and fourth UEs, even when all four UEs use a same set of sidelink resource pools or sidelink component carriers.

As indicated above, FIG. 13 is provided as an example. Other examples may differ from what is described with regard to FIG. 13.

Figure 14:
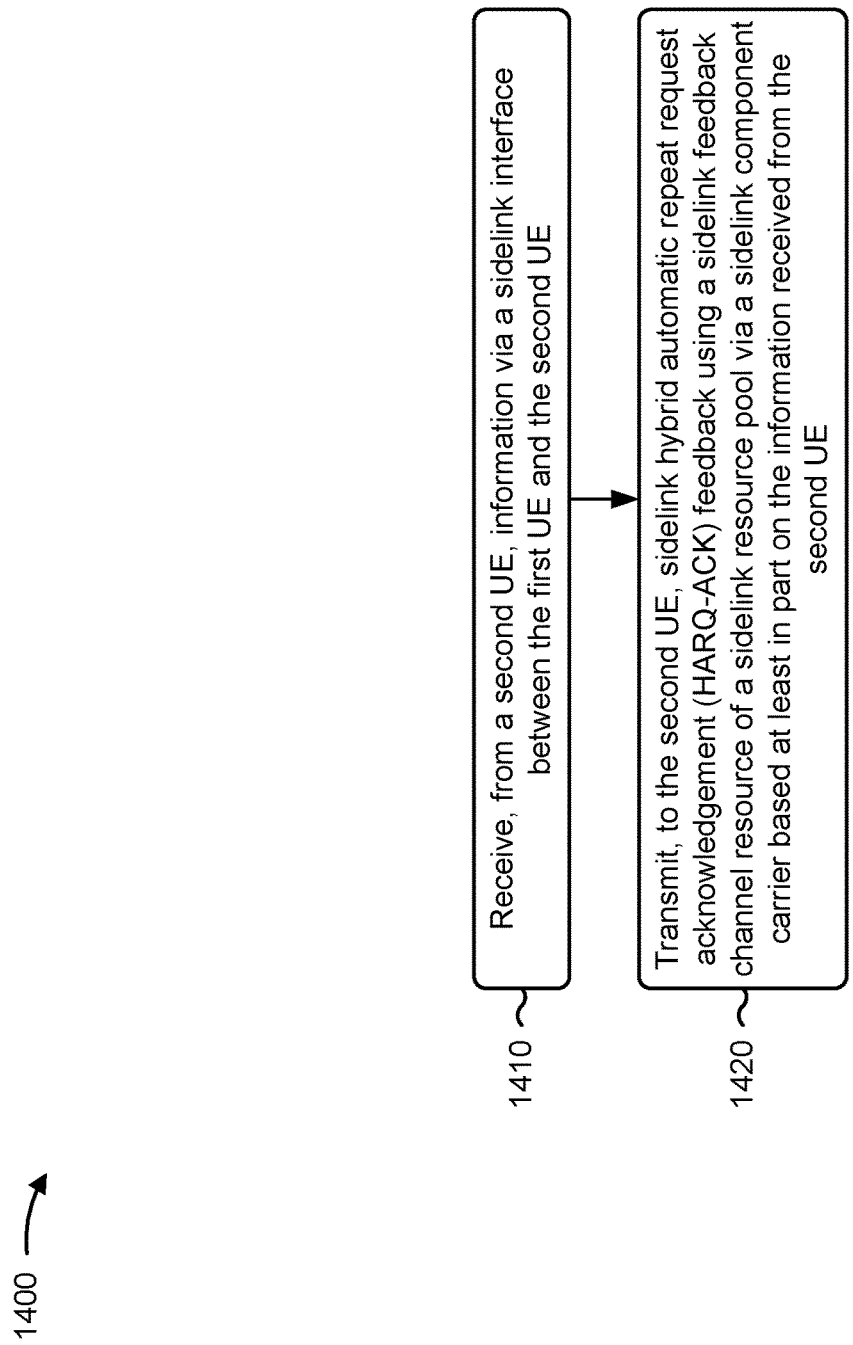
FIG. 14 is a diagram illustrating an example process associated with feedback transmission via a sidelink feedback channel resource of a sidelink resource pool, in accordance with various aspects of the present disclosure.

FIG. 14 is a diagram illustrating an example process 1400 performed, for example, by a first UE, in accordance with various aspects of the present disclosure. Example process 1400 is an example where the first UE (e.g., UE 120) performs operations associated with feedback transmission via a sidelink feedback channel resource of a sidelink resource pool.

As shown in FIG. 14, in some aspects, process 1400 may include receiving, from a second UE, information via a sidelink interface between the first UE and the second UE (block 1410). For example, the UE (e.g., using reception component 1502, depicted in FIG. 15) may receive, from a second UE, information via a sidelink interface between the first UE and the second UE, as described above.

As further shown in FIG. 14, in some aspects, process 1400 may include transmitting, to the second UE, sidelink HARQ-ACK feedback using a sidelink feedback channel resource of a sidelink resource pool via a sidelink component carrier based at least in part on the information received from the second UE (block 1420). For example, the UE (e.g., using transmission component 1504, depicted in FIG. 15) may transmit, to the second UE, sidelink HARQ-ACK feedback using a sidelink feedback channel resource of a sidelink resource pool via a sidelink component carrier based at least in part on the information received from the second UE, as described above.

Process 1400 may include additional aspects, such as any single aspect or any combination of aspects described below and/or in connection with one or more other processes described elsewhere herein.

In a first aspect, the sidelink HARQ-ACK feedback is managed per sidelink component carrier and per sidelink resource pool, the sidelink resource pool is configured with the sidelink feedback channel resource to enable a transmission of the sidelink HARQ-ACK feedback, or the sidelink component carrier is included in a group of preconfigured sidelink component carriers that are aggregated when sidelink carrier aggregation is configured for the first UE and the second UE.

In a second aspect, alone or in combination with the first aspect, the group of preconfigured sidelink component carriers are associated with a common sidelink feedback channel configuration, or the group of preconfigured sidelink component carriers correspond to sidelink component carriers on which the UE is able to perform a simultaneous transmission with aligned channels and are associated with a common sidelink feedback channel configuration.

In a third aspect, alone or in combination with one or more of the first and second aspects, the sidelink component carrier is included in a group of intra-band sidelink component carriers that are aggregated when sidelink carrier aggregation is configured for the first UE and the second UE, wherein the intra-band sidelink component carriers are associated with a common sidelink feedback channel configuration.

In a fourth aspect, alone or in combination with one or more of the first through third aspects, the sidelink component carrier is a first sidelink component carrier, and a rate matching pattern associated with the first sidelink component carrier is a function of a sidelink feedback channel configuration of a second sidelink component carrier that is aggregated with the first sidelink component carrier.

In a fifth aspect, alone or in combination with one or more of the first through fourth aspects, the rate matching pattern is defined per sidelink component carrier, or the sidelink feedback channel configuration includes a periodicity.

In a sixth aspect, alone or in combination with one or more of the first through fifth aspects, a first slot associated with the first sidelink component carrier is not associated with a sidelink feedback channel resource and a second slot associated with the second sidelink component carrier is associated with a sidelink feedback channel, wherein a length of a sidelink control channel or a length of a sidelink shared channel associated with the first sidelink component carrier is shortened to correspond to a length of the sidelink feedback channel of the second slot, or the rate matching pattern for a first group of UEs that includes the first UE and the second UE does not affect a second group of UEs, wherein the first group of UEs and the second group of UEs are associated with a same set of sidelink component carriers or a same sidelink resource pool.

In a seventh aspect, alone or in combination with one or more of the first through sixth aspects, the sidelink component carrier is a first intra-band sidelink component carrier, and a rate matching pattern associated with the first intra-band sidelink component carrier is a function of a sidelink feedback channel configuration of a second intra-band sidelink component carrier that is aggregated with the first intra-band sidelink component carrier.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
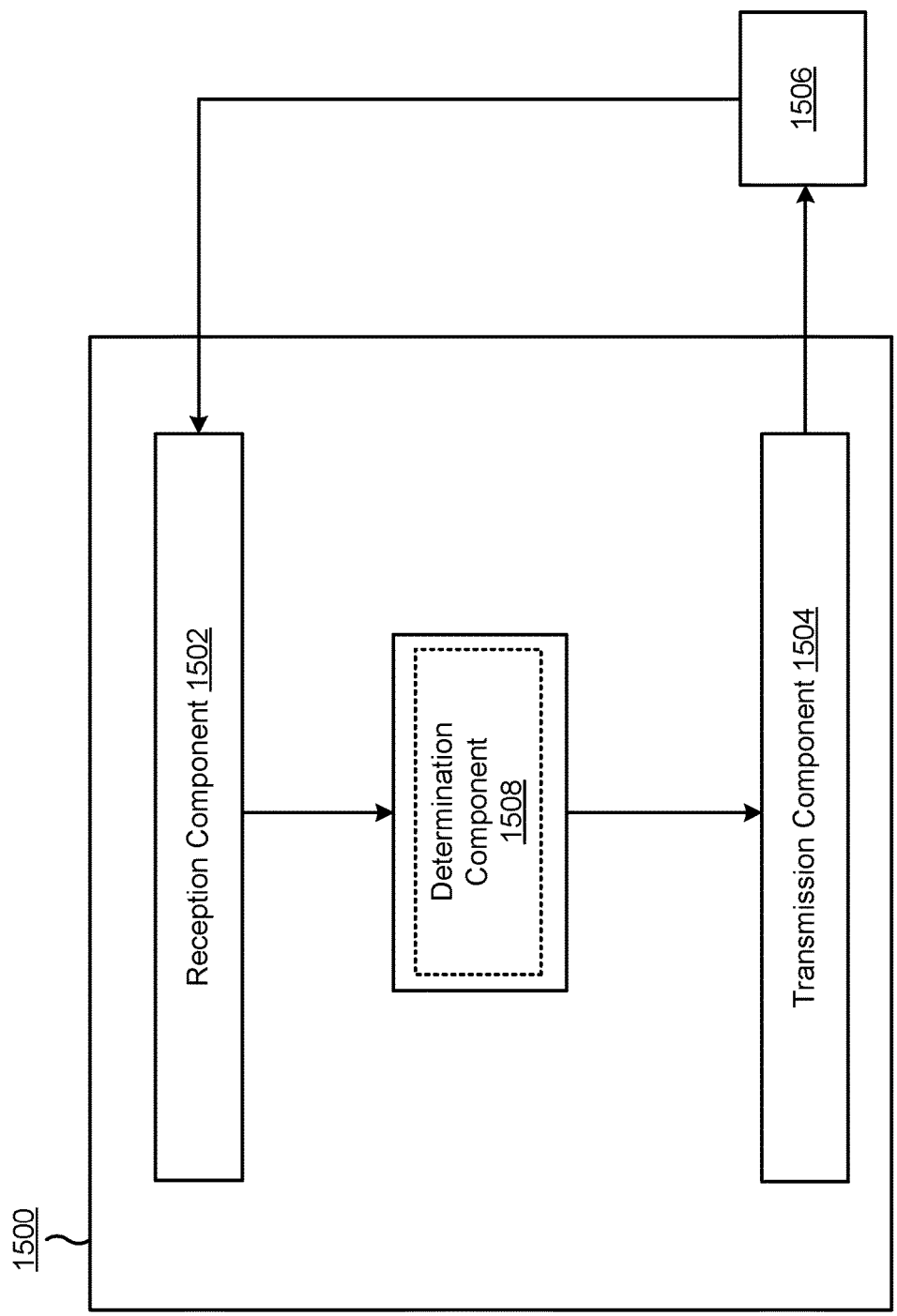
FIG. 15 is a block diagram of an example apparatus for wireless communication, in accordance with various aspects of the present disclosure.

FIG. 15 is a block diagram of an example apparatus 1500 for wireless communication. The apparatus 1500 may be a first UE, or a first UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 7-13. Additionally, or alternatively, the apparatus 1500 may be configured to perform one or more processes described herein, such as process 1400 of FIG. 14. In some aspects, the apparatus 1500 and/or one or more components shown in FIG. 15 may include one or more components of the first UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the first UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first UE described above in connection with FIG. 2. In some aspects, the transmission component 1504 may be co-located with the reception component 1502 in a transceiver.

The reception component 1502 may receive, from a second UE, information via a sidelink interface between the first UE and the second UE. The transmission component 1504 may transmit, to the second UE, sidelink HARQ-ACK feedback using a sidelink feedback channel resource of a sidelink resource pool via a sidelink component carrier based at least in part on the information received from the second UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Aspect 1: A method of wireless communication performed by a first user equipment (UE), comprising: receiving, from a second UE, information via a sidelink interface between the first UE and the second UE; and transmitting, to the second UE, sidelink hybrid automatic repeat request acknowledgement (HARQ-ACK) feedback using a sidelink feedback channel resource of a sidelink resource pool via a sidelink component carrier based at least in part on the information received from the second UE.

Aspect 2: The method of aspect 1, wherein: the sidelink HARQ-ACK feedback is managed per sidelink component carrier and per sidelink resource pool.

Aspect 3: The method of any of aspects 1 through 2, wherein: the sidelink resource pool is configured with the sidelink feedback channel resource to enable a transmission of the sidelink HARQ-ACK feedback.

Aspect 4: The method of any of aspects 1 through 3, wherein: the sidelink component carrier is included in a group of preconfigured sidelink component carriers that are aggregated when sidelink carrier aggregation is configured for the first UE and the second UE.

Aspect 5: The method of aspect 4, wherein: the group of preconfigured sidelink component carriers are associated with a common sidelink feedback channel configuration.

Aspect 6: The method of any of aspects 4 through 5, wherein: the group of preconfigured sidelink component carriers correspond to sidelink component carriers on which the UE is able to perform a simultaneous transmission with aligned channels and are associated with a common sidelink feedback channel configuration.

Aspect 7: The method of any of aspects 1 through 6, wherein the sidelink component carrier is included in a group of intra-band sidelink component carriers that are aggregated when sidelink carrier aggregation is configured for the first UE and the second UE.

Aspect 8: The method of aspect 7, wherein the intra-band sidelink component carriers are associated with a common sidelink feedback channel configuration.

Aspect 9: The method of any of aspects 1 through 8, wherein the sidelink component carrier is a first sidelink component carrier, and wherein a rate matching pattern associated with the first sidelink component carrier is a function of a sidelink feedback channel configuration of a second sidelink component carrier that is aggregated with the first sidelink component carrier.

Aspect 10: The method of aspect 9, wherein: the rate matching pattern is defined per sidelink component carrier.

Aspect 11: The method of any of aspects 9 through 10, wherein: the sidelink feedback channel configuration includes a periodicity.

Aspect 12: The method of any of aspects 9 through 11, wherein: a first slot associated with the first sidelink component carrier is not associated with a sidelink feedback channel resource and a second slot associated with the second sidelink component carrier is associated with a sidelink feedback channel.

Aspect 13: The method of aspect 12, wherein: a length of a sidelink control channel or a length of a sidelink shared channel associated with the first sidelink component carrier is shortened to correspond to a length of the sidelink feedback channel of the second slot.

Aspect 14: The method of any of aspects 9 through 13, wherein: the rate matching pattern for a first group of UEs that includes the first UE and the second UE does not affect a second group of UEs, wherein the first group of UEs and the second group of UEs are associated with a same set of sidelink component carriers or a same sidelink resource pool.

Aspect 15: The method of any of aspects 1 through 14, wherein the sidelink component carrier is a first intra-band sidelink component carrier, and wherein a rate matching pattern associated with the first intra-band sidelink component carrier is a function of a sidelink feedback channel configuration of a second intra-band sidelink component carrier that is aggregated with the first intra-band sidelink component carrier.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, from a second UE and in a sidelink resource of a sidelink resource pool of a sidelink component carrier of a group of preconfigured sidelink component carriers, information via a sidelink interface between the first UE and the second UE; and
   transmitting, to the second UE, sidelink hybrid automatic repeat request acknowledgement (HARQ-ACK) feedback using a sidelink feedback channel resource of the sidelink resource pool via the sidelink component carrier of the group of preconfigured sidelink component carriers based at least in part on the information received from the second UE, wherein the sidelink resource pool is based at least in part on a common sidelink feedback channel configuration associated with the group of preconfigured sidelink component carriers.

2. The method of claim 1, wherein:
   the sidelink HARQ-ACK feedback is managed per sidelink component carrier of the group of preconfigured sidelink component carriers and per sidelink resource pool pools, wherein the group of preconfigured sidelink component carriers comprises a set of sidelink resource pools.

3. The method of claim 1, wherein:
   the sidelink resource pool is configured with the sidelink feedback channel resource to enable a transmission of the sidelink HARQ-ACK feedback.

4. The method of claim 1, wherein:
   the sidelink component carrier is included in Hall the group of preconfigured sidelink component carriers, wherein the group of preconfigured sidelink component carriers are aggregated when sidelink carrier aggregation is configured for the first UE and the second UE.

5. The method of claim 4, wherein:
the group of preconfigured sidelink component carriers correspond to sidelink component carriers on which the UE is able to perform a simultaneous transmission with aligned channels and are associated with the common sidelink feedback channel configuration.

6. The method of claim 1, wherein the sidelink component carrier is included in a group of intra-band sidelink component carriers that are aggregated when sidelink carrier aggregation is configured for the first UE and the second UE.

7. The method of claim 6, wherein the intra-band sidelink component carriers are associated with the common sidelink feedback channel configuration.

8. The method of claim 1, wherein the sidelink component carrier is a first sidelink component carrier, and wherein a rate matching pattern associated with the first sidelink component carrier is a function of a sidelink feedback channel configuration of a second sidelink component carrier that is aggregated with the first sidelink component carrier.

9. The method of claim 8, wherein:
the rate matching pattern is defined per sidelink component carrier.

10. The method of claim 8, wherein:
the sidelink feedback channel configuration includes a periodicity.

11. The method of claim 8, wherein:
a first slot associated with the first sidelink component carrier is not associated with a sidelink feedback channel resource and a second slot associated with the second sidelink component carrier is associated with a sidelink feedback channel.

12. The method of claim 11, wherein:
a length of a sidelink control channel or a length of a sidelink shared channel associated with the first sidelink component carrier is shortened to correspond to a length of the sidelink feedback channel of the second slot.

13. The method of claim 8, wherein:
the rate matching pattern for a first group of UEs that includes the first UE and the second UE does not affect a second group of UEs, wherein the first group of UEs and the second group of UEs are associated with a same set of sidelink component carriers or a same sidelink resource pool.

14. The method of claim 1, wherein the sidelink component carrier is a first intra-band sidelink component carrier, and wherein a rate matching pattern associated with the first intra-band sidelink component carrier is a function of a sidelink feedback channel configuration of a second intra-band sidelink component carrier that is aggregated with the first intra-band sidelink component carrier.

15. The method of claim 1, wherein the group of preconfigured sidelink component carriers correspond to a same subcarrier spacing.

16. A first user equipment (UE) for wireless communication, comprising:
a memory; and
one or more processors coupled to the memory, the one or more processors configured to cause the UE to:
receive, from a second UE and in a sidelink resource of a sidelink resource pool of a sidelink component carrier of a group of preconfigured sidelink component carriers, information via a sidelink interface between the first UE and the second UE; and
transmit, to the second UE, sidelink hybrid automatic repeat request acknowledgement (HARQ-ACK) feedback using a sidelink feedback channel resource of the sidelink resource pool via the sidelink component carrier of the group of sidelink component carriers based at least in part on the information received from the second UE, wherein the sidelink resource pool is based at least in part on a common sidelink feedback channel configuration associated with the group of preconfigured sidelink component carriers.

17. The UE of claim 16, wherein:
the sidelink HARQ-ACK feedback is managed per sidelink component carrier of the group of preconfigured sidelink component carriers and per sidelink resource pool, wherein the group of preconfigured sidelink component carriers comprises a set of sidelink resource pools.

18. The UE of claim 16, wherein:
the sidelink resource pool is configured with the sidelink feedback channel resource to enable a transmission of the sidelink HARQ-ACK feedback.

19. The UE of claim 16, wherein:
the sidelink component carrier is included in the group of preconfigured sidelink component carriers, wherein the group of preconfigured sidelink component carriers are aggregated when sidelink carrier aggregation is configured for the first UE and the second UE.

20. The UE of claim 19, wherein:
the group of preconfigured sidelink component carriers correspond to sidelink component carriers on which the UE is able to perform a simultaneous transmission with aligned channels and are associated with the common sidelink feedback channel configuration.

21. The UE of claim 16, wherein the sidelink component carrier is included in a group of intra-band sidelink component carriers that are aggregated when sidelink carrier aggregation is configured for the first UE and the second UE.

22. The UE of claim 21, wherein the intra-band sidelink component carriers are associated with the common sidelink feedback channel configuration.

23. The UE of claim 16, wherein the sidelink component carrier is a first sidelink component carrier, and wherein a rate matching pattern associated with the first sidelink component carrier is a function of a sidelink feedback channel configuration of a second sidelink component carrier that is aggregated with the first sidelink component carrier.

24. The UE of claim 23, wherein:
the rate matching pattern is defined per sidelink component carrier.

25. The UE of claim 23, wherein:
the sidelink feedback channel configuration includes a periodicity.

26. The UE of claim 23, wherein:
a first slot associated with the first sidelink component carrier is not associated with a sidelink feedback channel resource and a second slot associated with the second sidelink component carrier is associated with a sidelink feedback channel.

27. The UE of claim 26, wherein:
a length of a sidelink control channel or a length of a sidelink shared channel associated with the first sidelink component carrier is shortened to correspond to a length of the sidelink feedback channel of the second slot.

28. The UE of claim 23, wherein:
the rate matching pattern for a first group of UEs that includes the first UE and the second UE does not affect a second group of UEs, wherein the first group of UEs and the second group of UEs are associated with a same set of sidelink component carriers or a same sidelink resource pool.

29. The UE of claim 16, wherein the sidelink component carrier is a first intra-band sidelink component carrier, wherein a rate matching pattern associated with the first intra-band sidelink component carrier is a function of a sidelink feedback channel configuration of a second intra-band sidelink component carrier that is aggregated with the first intra-band sidelink component carrier.

30. The UE of claim 16, wherein the group of preconfigured sidelink component carriers correspond to a same subcarrier spacing.

* * * * *